Nov. 24, 1925.
J. B. OLSON
1,563,222
THERMOSTATIC CONTROL OF HEATING APPLIANCES FOR BROODERS
Filed March 8, 1924
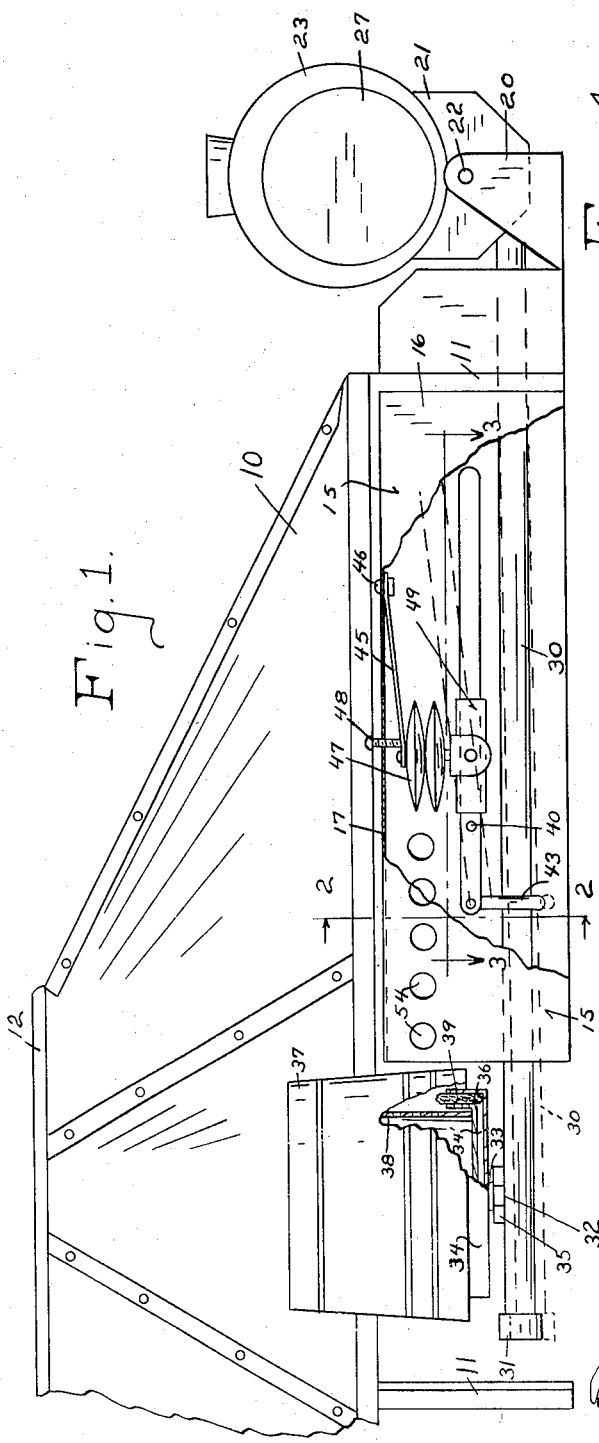
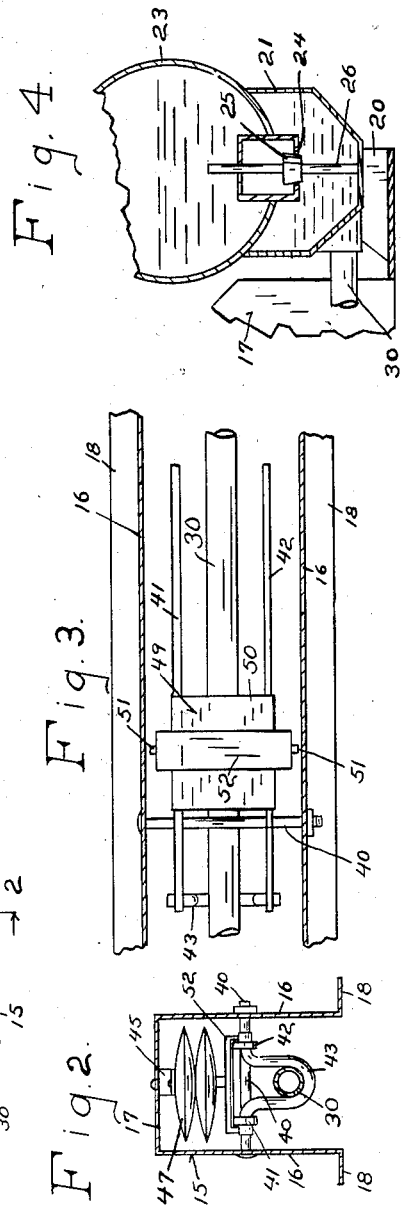
INVENTOR.
John B. Olson
BY
Erwin, Wheeler & Woolard
ATTORNEYS.

Patented Nov. 24, 1925.

1,563,222

UNITED STATES PATENT OFFICE.

JOHN B. OLSON, OF FORT ATKINSON, WISCONSIN, ASSIGNOR TO JAMES MANUFACTURING COMPANY, OF FORT ATKINSON, WISCONSIN.

THERMOSTATIC CONTROL OF HEATING APPLIANCES FOR BROODERS.

Application filed March 8, 1924. Serial No. 697,929.

*To all whom it may concern:*

Be it known that I, JOHN B. OLSON, a citizen of the United States, residing at Fort Atkinson, county of Jefferson, and State of Wisconsin, have invented new and useful Improvements in Thermostatic Control of Heating Appliances for Brooders, of which the following is a specification.

This invention relates to improvements in the thermostatic control of heating appliances for brooders and the like.

It is the primary object of this invention to produce a novel and simplified form of thermostatically controlled heating appliance. More particularly stated, it is my object to produce a device in which a thermostatic cell transmits motion to a very simple set of levers to regulate a burner by adjusting its height with reference to a constant level source of fuel supply, so that a constant temperature may be maintained within an enclosure housing the device.

Further objects of this invention are to provide a construction in which the burner may be adjusted with reference to a constant level source of fuel supply without using flexible connections or other fittings requiring packing; to provide a construction which is simply operative without attention on the part of the operator; to provide a device which is extremely sensitive to temperature changes and is so delicately balanced as to be operative under comparatively slight thermostatic pressures; to provide a device which may readily be adjusted by small amounts with great accuracy; and to provide a device which is particularly adapted for brooder use in form, and due to the fact that it is housed in a way to prevent young chicks from finding access to its operating parts.

In the drawings:

Figure 1 is a transverse section through a brooder, showing in side elevation a thermostatically controlled heating appliance embodying this invention, a portion of the walls of the appliance being broken away to expose its interior mechanism.

Figure 2 is a section taken on line 2—2 of Figure 1.

Figure 3 is a section taken on line 3—3 of Figure 1.

Figure 4 is a substantially central transverse section through the fuel tank and constant level chamber therebeneath.

Like parts are identified by the same reference characters throughout the several views.

The brooder or hover includes a canopy 10 supported by a number of legs 11, and provided at its top with an opening 12 for ventilation. This device is intended merely to typify various structures for the heating of which my improved thermostatically controlled unit is adapted. The brooder, therefore, may be understood to be of any ordinary construction and will not be described in detail herein.

The frame of the heating appliance to which this invention particularly relates comprises an inverted channel-shaped housing 15 having side walls 16, a top wall 17 and laterally projecting flanges 18 which are adapted to rest upon the earth or a floor and to receive support therefrom. Integral with the frame at its outer end are a pair of spaced upstanding ears 20 between which the fuel tank is suspended for pivotal movement on a horizontal axis. A constant level chamber 21 is connected to the ears 20 by means of pivot pins such as that shown at 22 and supports a removable fuel tank 23 having a valve controlled port 24 in its bottom. The valve 25 is provided with a stem at 26 adapted for contact with the bottom of constant level chamber 21, whereby, when the fuel tank 23 is in place upon such chamber, the valve will be forced open and the subsequent delivery of fuel from the tank will depend upon the entry of air through this valve to replace the fuel delivered. Such devices are well known, and the present construction may be understood to represent any of the various valves of this type. The fuel tank may conveniently be provided with a transparent window 27 in its end, whereby its contents will be visible at all times.

Obviously, the fuel tank will oscillate with the constant level chamber 21 upon the axis indicated at 22, but inasmuch as the valve of the tank is centrally located and the degree of oscillation produced by the operation of the thermostatic mechanism hereinafter to be described is very small at the tank, it will be clear that the oscillation of the tank will have no appreciable effect upon the level of fuel in the chamber 21.

A pipe 30 is rigidly connected with the chamber 21 and is in communication with the interior of said chamber. The rigid connection of the pipe with the chamber permits the pipe to be utilized in controlling the position of oscillation of the chamber and makes it unnecessary to provide a packed joint at this point.

Pipe 30 extends completely through the housing 17 from one end to the other thereof and projects therebeyond. It is capped at 31 and is provided with an opening on its upper side at 32. The threaded stem 33 of a burner designated in its entirety by reference character 34 is received into this opening and is secured by a lock nut 35 threaded to the stem 33. Stem 33 comprises a tube and opens into the radially divergent tubes 34' which communicate with a circumferential, upwardly opening channel 39, as is usual in burners of this type. Disposed in the channel is a wick 36 which may be made of asbestos or the like. The burner includes an outer frusto-conical shield 37 and an inner tubular shield 38 between which the flame is disposed when the burner is lighted. The two shields prevent cross drafts and ensure thorough combustion.

Obviously, the depth of fuel in the channel 35 will depend upon the vertical position of such channel with reference to the level of fuel in the chamber 21. I provide means now to be described whereby a thermostatic wafer or other similar appliance is utilized to adjust pipe 30, and thereby to move vertically through slight distances the burner 34 carried by such pipe. Thus, the depth of fuel in the burner is varied and the burner is caused to operate with more or less intense heat.

The balance of the oscillatable fuel system including the tank 23, supply chamber 21, pipe 30, and burner 34 is made delicate by means of a counter-balance which is arranged to support the major portion of the weight of the pipe and burner. For this purpose a transverse pivot bolt is provided at 40 in housing 15, and upon this bolt a pair of laterally spaced levers 41 and 42 are fulcrumed upon either side of pipe 30. The stirrup 43 is pivotally supported from the shorter ends of levers 41 and 42 and is arranged to support pipe 30 in the manner clearly shown in the drawings. The longer ends of the levers serve as counter-balance weights which operate to sustain most of the weight of pipe 30 and burner 34.

A flat spring 45 is bolted at 46 to the top wall 17 of the housing. To the free end of this spring is secured the upper wall of a double thermostatic wafer designated in its entirety by reference character 47. The wafer illustrated is one which is very well known, and inasmuch as its particular structure is unimportant it will not be described in detail herein. It is of the type, however, in which a flexibly walled expansible vessel is filled with a substance adapted to expand with increasing temperatures, and thereby to increase the length of the vessel. An adjusting screw 48 threaded through the top wall 17 of the housing and in operative bearing contact with spring 45 serves to regulate the vertical position of the free end of said spring, and, consequently, the height of the thermostatic appliance carried by the spring.

The weight of the burner 34 and pipe 30 in excess of that weight which is counter-balanced by levers 41 and 42 will cause such levers to oscillate about their fulcrum on bolt 40 to a point where the saddle 49 will contact with the lower wall of the thermostatic appliance. Obviously, the expansion or contraction of the thermostatic appliance and the consequent change in length thereof will operate to vary the position of levers 41 and 42 and consequently to adjust the height of burner 34 with reference to the constant level source of fuel.

If desired, the saddle 49 may be constructed as indicated in the drawings, to provide a part self adjustable with reference to the thermostat. For this purpose the saddle comprises a plate 50 connecting levers 41 and 42 to make them act substantially in unison. Pivoted at 51 to the bolt and to the levers 41 and 42 is a U-shaped member 52 to which the expansible and retractible portion of the thermostatic appliance is connected. Thus, I provide a connection between the thermostat and the levers which adapts itself to the varying angular positions of these parts.

It will be noted that the expanding pressure of the thermostat is applied downwardly upon levers 41 and 42, whereby to lift the shorter ends of such levers, and consequently, to elevate the burner with reference to the source of fuel supply. Thus, when the temperature at the thermostat increases, the depth of fuel in the burner will be decreased, and the intensity of the burner flame will be similarly decreased. Likewise, when the temperature at the thermostat decreases, the weight of the pipe 30 and burner 34, being in excess of the counter-balancing force exerted by levers 41 and 42, will cause saddle 49 to move upwardly to any degree permitted by the contraction of the thermostatic appliance.

The initial setting of the device for any required amount of heat is determined with great accuracy by an adjustment of screw 48. If said screw is adjusted upwardly the thermostat will likewise be forced upwardly by the unbalanced weight of the burner and pipe, and by the action of spring 45. As a consequence, the levers 41 and 42 will oscillate counter-clockwise to lower the burner and pipe, and consequently to decrease the average height at which the burner will be maintained. If the screw 48 be turned downwardly a converse action results and the average height of the burner is adjusted upwardly to maintain lower temperatures.

It will be noted that this entire device is sturdily designed and nevertheless is adapted to operate with precision. There are few moving parts and such parts transmit the temperature induced movement of the thermostatic appliance very directly to the fuel system to provide a relative vertical adjustment between the constant level fuel supply and the burner and thereby to regulate fuel flow to the burner. The balance of the parts is in no way dependent upon the amount of fuel in tank 23, since the tank is positioned directly above the fulcrum upon which the fuel system oscillates, and the degree of oscillation is so slight as not to bring the weight of the tank appreciably to one side or the other of the fulcrum.

I desire to call attention to the fact that the heating plant constitutes a unit in itself which may be utilized in connection with a brooder or for any other allied purpose. It is self contained and is particularly adapted for brooder purposes, in that the portion of the structure intermediate the tank and the burner is relatively low in height so that it can readily be extended beneath the marginal portions of a brooder canopy without requiring any special excavation or other adaptation. In other words, the unit herein disclosed is adapted to be used with brooders which have previously been manufactured as well as with new articles in which it may be incorporated by the manufacturer, if desired.

It will be noted further that the housing 15 is provided with a series of small apertures 54 which permit a circulation of air therethrough in such a manner that the temperatures existing within the brooder may be communicated readily to the thermostatic appliance 47. At the same time, the housing is so constructed as to be inaccessible to chicks. The fuel tank and constant level chamber close the outer end of the housing and the burner and fuel pipe close the inner end thereof. Thus, the housing is not only simplified, due to the fact that it needs no end walls, but there is a further advantage arising from the provision for subjecting the thermostat appliance to direct radiation from the burner.

The features above described will be found to contribute to a very satisfactory and practical operation of the particular embodiment of this invention herein disclosed. I wish to point out, however, that the principles herein disclosed may be utilized in the construction of various devices of this character, differing widely from the particular construction by which the invention has been exemplified. I do not wish to limit myself to any details of construction except as hereinafter pointed out in the appended claims.

I claim:

1. In a device of the character described, the combination with a fuel system comprising a supply tank, a pipe, and a burner in rigid connection and fulcrumed for oscillation, whereby such oscillation will vary the depth of fuel at the burner; of a thermostat operable on said fuel system to oscillate the said system about its fulcrum and thereby to control the heat generated by the burner, said system being organized to present a substantially constant load to said thermostat irrespective of variations in the quantity of fuel in said tank.

2. In a device of the character described, the combination with a fuel system comprising a supply tank, a pipe, and a burner in rigid connection and fulcrumed for oscillation about a pivot point remote from said burner, whereby such oscillation will vary the depth of fuel at the burner; of a thermostat operable on said fuel system to oscillate the said system about its fulcrum and thereby to control the heat generated by the burner, said system being organized to present a substantially constant load to said thermostat irrespective of variations in the quantity of fuel in said tank.

3. In a device of the character described, the combination with a fuel system unit comprising a constant level source of supply and a burner rigidly connected in operative communication therewith and mounted for oscillation in an upright plane about a given fulcrum, said system being substantially counterbalanced to oscillate freely in response to light pressures, of a thermostat operatively connected with said system at a point remote from said fulcrum and adapted for the oscillation thereof subject to temperature changes.

4. In a device of the character described, the combination with a fuel system unit comprising a constant level source of supply and a burner rigidly connected in operative communication and mounted for oscillation in a vertical plane about a given fulcrum, said system being substantially counterbalanced to oscillate freely in response to light pressures, of a thermostat, an adjustable mounting for said thermostat, and an operative connection between said thermostat and a part of said system remote from said fulcrum, whereby the movements of said thermostat will be communicated to said system for the oscillation thereof.

5. In a device of the character described, the combination with a fuel system including a constant level chamber, a pipe rigidly connected therewith, and a burner connected with said pipe, of a fulcrum support for said system adjacent said chamber, a lever of the first class applied to said system at a point remote from said fulcrum and adapted to sustain a portion of the weight of said system, and a thermostatic appliance including an automatically adjustable portion operatively connected with said lever to transmit motion therethrough to said system.

6. In a device of the character described, the combination of a self-contained heating unit comprising a housing, a pipe extending therethrough and pivoted to the housing, a burner operatively connected with the pipe at a point remote from the pivot of said pipe to the housing, and a thermostat connected to said housing on the interior thereof and operatively connected with said pipe for the oscillation thereof, said thermostat and pipe being protected by said housing from interference with their functions, and said housing being adapted to permit said thermostat to act subject to thermal changes exteriorly of said housing.

7. A heating unit adapted to be applied to structures having low openings to their interior, said unit comprising a relatively low frame, a fuel system mounted in said frame and including a fuel tank fulcrumed thereto and adapted to be positioned exteriorly of such an opening, a fuel pipe adapted to extend through the opening and a burner rigidly connected with said pipe, and a thermostatic appliance having a portion in relatively fixed connection with said frame and having a movable portion operatively connected with said pipe and adapted to elevate said pipe and burner responsive to increases in temperature.

8. In a device of the character described, the combination of a housing, a pipe extending therethrough and pivoted to the housing, a burner associated with the pipe at a point remote from its pivotal connection with the housing, a lever fulcrumed from the housing and connected with said pipe, and a thermostat wafer adapted to apply downward pressure on said lever responsive to temperature increases, whereby to elevate said burner.

9. In a device of the character described, the combination with a constant level source of fuel supply, of a pipe in operative connection with said source and provided with a vertically adjustable portion remote therefrom, a burner connected with said portion of said pipe and adapted to produce a flame variable in intensity with the depth of fuel in said burner, a lever operatively connected to support a portion of the weight of said burner, and a thermostatic appliance operating through said lever to adjust the height of said burner with reference to said source.

10. In a device of the character described, a burner, a pipe section in rigid connection therewith, a lever comprising a pair of laterally spaced members embracing said pipe section and provided with an intermediate stirrup for the support thereof, a fulcrum support for said lever, and a thermostatic appliance including an automatically adjustable portion operatively connected with said lever across said fulcrum from said stirrup.

11. In a device of the character described, the combination with a burner and a vertically adjustable pipe section operatively connected therewith for the support thereof, a lever of the first class having relatively long and short arms and including a pair of laterally spaced members, a stirrup connected with the short arm of said lever and extending beneath said pipe section and between said members, a saddle connecting said members on the longer arm of the lever, and a thermostatic wafer having a portion in relatively fixed position and having an expansible portion in operative bearing with said saddle.

12. In a device of the character described, a thermostatic mounting comprising a support, a spring connected to said support and having a movable portion, a thermostatic unit connected with said portion, and a screw threadedly connected with said support and operative to adjust the position of said unit in opposition to said spring.

13. In a device of the character described, the combination with a housing, of a pipe fulcrumed thereto, a burner carried by a freely movabe portion of said pipe, a lever of the first class fulcrumed to said housing and provided with a relatively short arm connected with a movable portion of said pipe, and a thermostatic unit connected with said housing and having an automatically adjustable portion bearing upon the relatively longer arm of said lever.

14. In a device of the character described, the combination with a housing, of a pipe fulcrumed thereto, a burner carried by a movable portion of said pipe, a lever of the first class having a relatively short arm connected with a movable portion of said pipe, an expansible thermostatic unit, a flexible unit-positioning member connected with the top of said unit and connected with said housing, and a screw adjustably opposing the upward movement of said unit, said unit being positioned above the longer arm of said lever to limit the upward movement of such arm and being confined between said screw and said arm.

15. In a device of the character described, the combination of a housing comprising an elongated channel open at its ends, a constant level fuel chamber fulcrumed to the side walls of said channel adjacent one end of said housing, a pipe extending through said housing and rigidly connected with said chamber, a burner supported by a movable portion of said pipe, a transverse fulcrum bolt in said housing, a lever pivoted on said bolt and provided with an arm connected with a movable portion of said pipe, said lever being adapted as a counter-balance for the partial support of said burner, and a thermostatic appliance within said housing in operative bearing contact with said lever and adapted therethrough to support a portion of the weight of said burner, the positions of said burner and said chamber with reference to the ends of said housing being adapted to substantially close said housing against the entry of small animals.

16. In a device of the character described, the combination with a fuel chamber, of a pipe fulcrumed immediately therebeneath and in operative communication therewith, a burner mounted on said pipe for movement therewith above said fulcrum and in communication therethrough with said chamber and a thermostat operatively arranged to control the oscillation of said pipe and burner above said fulcrum, said thermostat being of a type adapted to lower said burner with reference to said fuel chamber responsive to an excess of heat.

17. In a device of the character described, the combination with a constant level fuel chamber fulcrumed for oscillation, of a pipe and a burner in rigid connection with said chamber for oscillation therewith in a substantially vertical plane, whereby to vary the relative heights of said burner and chamber, said burner and chamber being in communication through said pipe, together with a thermostat operatively connected with said burner for the vertical adjustment thereof responsive to temperature changes.

18. In a device of the character described, the combination with a fuel system including a constant level chamber, a pipe and a burner in operative communication and mounted for oscillation about a substantially horizontal fulcrum at said chamber, the weight of portions of said system remote from said fulcrum being substantially counterbalanced, of a thermostat operatively connected with said system for the oscillation thereof responsive to temperature changes and adapted to lower said burner with reference to said chamber responsive to decreases in temperature and to elevate said burner with respect to said chamber responsive to increases of temperature.

JOHN B. OLSON.